(12) United States Patent
Kajiwara et al.

(10) Patent No.: US 6,492,446 B1
(45) Date of Patent: Dec. 10, 2002

(54) ALATEX COMPOUND FOR DIP MOLDING AND A DIP-MOLDED PRODUCT

(75) Inventors: Yuichiro Kajiwara, Osaka (JP); Masaaki Tsuji, Osaka (JP); Shigeo Suzuki, Osaka (JP); Takashi Suetsugu, Osaka (JP); Hiroshi Ban, Osaka (JP)

(73) Assignee: Takeda Chemical Industries, Ltd., Osaka (JP)

( * ) Notice: Subject to any disclaimer, the term of this patent is extended or adjusted under 35 U.S.C. 154(b) by 177 days.

(21) Appl. No.: 09/594,788

(22) Filed: Jun. 16, 2000

(30) Foreign Application Priority Data

Jun. 21, 1999 (JP) ............................................. 11-174656
Feb. 21, 2000 (JP) ........................................ 2000-042983

(51) Int. Cl.⁷ .............................. C08L 9/04; C08L 9/10; C08F 2/26; C08K 5/09; C08K 5/42
(52) U.S. Cl. ........................ 524/157; 524/158; 524/166; 524/201; 524/322; 524/377; 524/394; 524/458; 524/556; 524/565; 524/571
(58) Field of Search ................................. 524/157, 158, 524/166, 301, 322, 377, 394, 458, 556, 565, 571

(56) References Cited

U.S. PATENT DOCUMENTS 4,510,204 A * 4/1985 Duke et al. .................. 428/463
5,369,166 A * 11/1994 Ozawa et al. ................ 524/560
5,496,884 A * 3/1996 Weih et al. .................. 524/503
5,750,618 A * 5/1998 Vogt et al. ................... 524/836
6,242,524 B1 * 6/2001 Schulz ........................ 524/505

FOREIGN PATENT DOCUMENTS

| JP | 51080343 | * | 7/1976 | ............... C08J/3/06 |
| JP | 04149216 | * | 5/1992 | ......... C08F/279/02 |
| JP | 7-316211 | | 12/1995 | |

* cited by examiner

Primary Examiner—David W. Wu
Assistant Examiner—Kelechi C. Egwim
(74) Attorney, Agent, or Firm—Wenderoth, Lind & Ponack, L.L.P.

(57) ABSTRACT

A latex compound for dip molding, which can be used for production of a high-quality dip-molded product that is excellent in oil resistance and mechanical strength, has uniform film thickness and soft feeling to the skin and is free of pinholes, as is required for gloves etc. especially in the medical fields, and assumes no stickiness on the surface of the molded product after molding. This object is attained by a latex compound for dip molding which comprises a copolymer latex (L) obtained by emulsion polymerization of a monomer mixture and 0.05 to 5.0 parts by weight of a bubble breaker (A) consisting of a $C_{8-22}$ fatty acid or a salt thereof, and if necessary, 0.1 to 5.0 parts by weight of a di $C_{5-12}$ alkyl sulfosuccinate salt (B) and/or 0.5 to 10.0 parts by weight of a $C_{13-20}$ alkyl benzene sulfonate (C) per 100 parts by weight of the monomer mixture.

10 Claims, No Drawings

A LATEX COMPOUND FOR DIP MOLDING AND A DIP-MOLDED PRODUCT

TECHNICAL FIELDS OF THE INVENTION

The present invention relates to a latex compound for dip molding, particularly a latex compound for dip molding from which can be used for easily and efficiently producing a dip-molded product feeling soft and satisfying properties such as excellent oil resistance required for gloves used in medical fields and in a clean room for producing electronic parts, high mechanical strength and the absence of pinholes, as well as a dip-molded product obtained therefrom.

BACKGROUND OF THE INVENTION

Dip-molded products such as gloves and fingerstalls used in the fields of medicine, hygiene and production of electronic parts should be excellent in oil resistance and mechanical strength, free of pinholes and also excellent in close fitting thereof to the skin.

As the method of dip molding, there are known an anode coagulant dip process wherein a mold made of wood, glass, ceramics, metal or plastics is dipped in a coagulant and then dipped in natural latex or synthetic rubber latex, and a Teague coagulant dip process, wherein a mold is dipped in latex and then dipped in a coagulant. The molded products obtained by these dip processes are called as a dip-molded product.

The film thickness of a dip-molded product such as a glove, the occurrence of pinholes therein and the close fitting thereof to the skin depend mainly on the latex compound and a coagulant.

Most of latex used heretofore in the dip molding method is natural rubber latex or synthetic rubber latex, but for the reason of high resistance to oil and organic solvent, acrylonitrile butadiene rubber (NBR) latex is preferably used. Recently, the NBR latex has been used more and more owing to the development of allergy in those who use natural rubber latex gloves. However, molded products produced from NBR by dip molding, though being excellent in oil resistance, have high glass transition temperature (Tg), and thus they hardly give soft feeling to the skin.

Accordingly, there are methods wherein, for instance, a conjugated diene compound such as butadiene is used in a larger amount in production of NBR, or NBR is blended with natural rubber, and NBR are laminated on the natural rubber layer. In these cases, however, the resulting products are poor in oil resistance or chemical resistance.

Meanwhile, as the method of obtaining NBR film which is excellent in oil resistance and has soft feeling to the skin, there are proposed methods wherein e.g. the molecular weight of copolymer latex and the content of insolubles in methyl ethyl ketone therein are prescribed (JP-A 5-247266 and JP-A 6-182788), but it cannot be said that the object has been achieved satisfactorily.

Along with this soft feeling to the skin, the presence or absence of pinholes is important for the gloves. In particular, when the molded product is used for medical purposes such as a surgical gloves, the presence of pinholes is fatal. The pinhole is easily generated if bubbles are mixed in latex compound, the chemical stability of latex compound to a coagulant is high, or the wettability of latex compound on a mold is not satisfactory. Bubbles in latex compound occurs mainly due to stirring during synthesis of latex or during addition of other ingredients to latex. Once bubbles are mixed, they do not easily disappear owing to the action of an emulsifying agent etc. in latex compound, and pinholes in the molded product are generated. If the chemical stability of latex compound to a coagulant is high or the wettability of latex compound on a mold is not satisfactory, then the film thickness of the molded product may become uneven or pinholes may be generated.

It is also important for the molded products that the surface of the molded product is not sticky. This stickiness is a property permitting products produced by dip molding to adhere one another owing to the sticky surfaces of the molded products. Once the molded products assume stickiness, their qualities are lowered and, resulted in a significant reduction in their commercial value.

SUMMARY OF THE INVENTION

The object of the present invention is to provide a latex compound for dip molding, which can be used for production of a dip-molded product that is excellent in oil resistance and mechanical strength, has uniform film thickness and soft feeling to the skin and no pinholes, and assumes no stickiness of the surface after molding.

As a result of their eager study for solving this object, the present inventors found that a specific amount of a bubble breaker consisting of a fatty acid containing 8 to 22 carbon atoms or a salt thereof, and preferably additionally a dialkylsulfosuccinate salt containing 5 to 12 carbon atoms for the respective alkyl groups and/or an alkyl benzene sulfonate whose alkyl group contains 13 to 20 carbon atoms, are blended with copolymer latex obtained by emulsion polymerization of a monomer mixture, whereby the bubble-breaking abilities of latex compound, the wettability of latex compound on the surface of a mold, the chemical stability of latex compound to a coagulant, and the anti-stickiness of the molded product are significantly improved, and on the basis of this finding, they extensively studied and completed the present invention.

That is, the present invention relates to:

(1) A latex compound for dip molding, which comprises a copolymer latex (L) obtained by emulsion polymerization of a monomer mixture and 0.05 to 5.0 parts by weight of a bubble breaker (A) consisting of a fatty acid containing 8 to 22 carbon atoms or a salt thereof per 100 parts by weight of the monomer mixture, (2) The latex compound for dip molding according to item 1, which further comprises 0.1 to 5.0 parts by weight of a dialkylsulfosuccinate salt (B) represented by formula (1):

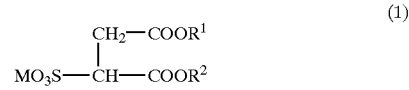

wherein $R^1$ and $R^2$ are the same or different and represent an alkyl group containing 5 to 12 carbon atoms and M is metal ion or ammonium ion, and/or 0.5 to 10.0 parts by weight of an alkyl benzene sulfonate (C) whose alkyl group contains 13 to 20 carbon atoms per 100 parts by weight of the monomer mixture;

(3) The latex compound for dip molding according to item 1 or 2, which further comprises 0.01 to 1.0 part by weight of a thickener per 100 parts by weight of the monomer mixture;

(4) The latex compound for dip molding according to item 1 or 2, wherein the emulsion polymerization of the monomer mixture is conducted in the presence of a polyhydroxy compound;

(5) The latex compound for dip molding according to item 4, wherein the polyhydroxy compound is a glycol;

(6) The latex compound for dip molding according to item 1 or 4, wherein the monomer mixture comprises 15 to 45 parts by weight of a vinyl cyanide monomer, 35 to 80 parts by weight of a conjugated diene monomer, 0.1 to 20 parts by weight of an ethylenically unsaturated carboxylic acid monomer, and 0 to 20 parts by weight of other ethylenically unsaturated monomers copolymerizable with the above monomers in 100 parts by weight of the monomer mixture;

(7) The latex compound for dip molding according to item 1, wherein the copolymer latex (L) has 51 to 90% by weight of gel content (methyl ethyl ketone-insolubles);

(8) The latex compound for dip molding according to item 1 or 6, wherein the copolymer latex (L) is obtained by emulsion polymerization of the monomer mixture in the presence of a seed polymer having an average particle diameter of 20 to 90 nm and glass transition temperature (Tg) of −50 to 50° C. obtained by emulsion polymerization between a vinyl cyanide monomer and an ethylenically unsaturated monomer copolymerizable therewith;

(9) The latex compound for dip molding according to item 1, wherein the bubble breaker (A) comprises 15 to 50% by weight of stearic acid or a salt thereof;

(10) A dip-molded product produced by dip molding from the latex compound for dip molding according to any one of items 1 to 9; and

(11) The dip-molded product according to item 10, which is a glove.

DETAILED DESCRIPTION OF THE INVENTION

The process for producing a latex component for dip molding according to the present invention is described below.

In the present invention, the bubble breaker (A) and, if necessary, the component (B) and/or the component (C) are blended with the copolymer latex (L) obtained by emulsion polymerization of a monomer mixture.

The copolymer latex (L) used in the present invention is obtained by emulsion polymerization of a monomer mixture, and the monomer is not particularly limited insofar as the resulting polymer has rubber-like properties. Preferably the monomer mixture comprises a vinyl cyanide monomer, a conjugated diene monomer and an ethylenically unsaturated carboxylic acid monomer and if necessary an ethylenically unsaturated monomer copolymerizable with these monomers.

The vinyl cyanide monomer includes acrylonitrile, methacrylonitrile, α-cyanoethylacrylonitrile, fumaronitrile etc. These vinyl cyanide monomers can be used singly or in combination thereof. In the present invention, acrylonitrile is particularly preferably used.

The amount of such a vinyl cyanide monomer used is 15 to 45 parts by weight, preferably 23 to 40 parts by weight, in 100 parts by weight of the monomer mixture. If the amount of the vinyl cyanide monomer is less than 15 parts by weight, the oil resistance and chemical resistance of the resulting dip-molded product may be inadequate, whereas if it exceeds 45 parts by weight, the copolymerization reaction between the vinyl cyanide monomer and the conjugated diene monomer hardly proceeds so that a homopolymer of the vinyl cyanide monomer may be formed.

The conjugated diene monomer used may be a monomer usually used for production of latex, such as 1,3-butadiene, isoprene, 2-chloro-1,3-butadiene and 2-methyl-1,3-butadiene. These conjugated diene monomers can be used alone or in combination thereof. In the present invention, 1,3-butadiene is preferably used.

The amount of such a conjugated diene monomer used is in the range of 35 to 80 parts by weight, preferably 45 to 70 parts by weight, in 100 parts by weight of the monomer mixture.

If the amount of the conjugated diene monomer used is less than 35 parts by weight, the resulting dip-molded product may feel stiff. On the other hand, if it is more than 80 parts by weight, the strength of the dip-molded product may be lowered.

The ethylenically unsaturated carboxylic acid monomer includes e.g. monocarboxylic acids such as (meth)acrylic acid and crotonic acid, and dicarboxylic acids such as maleic acid, fumaric acid and itaconic acid, as well as anhydrides thereof, for example dicarboxylic acid monoesters i.e. half esters such as methyl maleate and methyl itaconate. These ethylenically unsaturated carboxylic acid monomers can be used alone or in combination thereof. Further, these ethylenically unsaturated carboxylic acid monomers can also be used as alkali metal salts or ammonium salts. Among these, acrylic acid and methacrylic acid are particularly preferably used.

The amount of such an ethylenically unsaturated carboxylic acid monomer used is in the range of 0.1 to 20 parts by weight, preferably 1 to 15 parts by weight and more preferably 3 to 7 parts by weight in 100 parts by weight of the monomer mixture. If its amount is less than 0.1 part by weight, the strength of the resulting dip-molded product may be lowered. On the other hand, if it is more than 20 parts by weight, the product may feel stiff.

The copolymerizable ethylenically unsaturated monomers other than the monomers described above include e.g. aromatic vinyl compounds such as styrene and α-methylstyrene, unsaturated alkyl carboxylates such as methyl acrylate, ethyl acrylate, butyl acrylate, 2-hydroxyethyl acrylate, methyl methacrylate, 2-hydroxyethyl methacrylate and glycidyl methacrylate, ethylenically unsaturated carboxylic acid amide compounds such as acrylamide, methacrylamide, N,N-dimethylacrylamide and N-methylolacrylamide, vinyl carboxylates such as vinyl acetate, and ethylenically unsaturated amine compounds such as methyl aminoethyl (meth)acrylate, dimethyl aminoethyl (meth)acrylate and 2-vinylpyridine. These can be used singly or in combination thereof.

The amount of these ethylenically unsaturated monomers used is 0 to 20 parts by weight, preferably 1 to 10 parts by weight, in 100 parts by weight of the monomer mixture.

In the present invention, a polyhydroxy compound may be present at the time of production of copolymer latex composition in order to improve the flexibility of the resulting dip-molded product.

The polyhydroxy compound is used to confer soft feeling to the skin on the dip-molded product, and it is added preferably before or during polymerization of copolymer latex. In the case where the polyhydroxy compound is added during polymerization, it is added preferably before the degree of polymerization of the monomer mixture reaches 70%, preferably 50%, because its softening effect tends to decrease as the degree of polymerization increases.

Such a polyhydroxy compound includes preferably a polyhydroxy compound with a molecular weight of 1000 or less, and the examples include glycols such as ethylene glycol, propylene glycol, dipropylene glycol, trimethylene glycol, 1,4-butane diol, 1,5-pentane diol, 1,6-hexane diol and pinacol, trivalent alcohols such as glycerin and trimethylol propane, tetravalent alcohols such as erythritol, pentaerythritol and threitol, and hexavalent alcohols such as sorbitol, as well as sucrose and other polyether polyols. Among these, glycols are preferable, and propylene glycol is more preferable. The amount of the polyhydroxy compound used is preferably in the range of 1 to 10 parts by weight, more preferably 2 to 7 parts by weight, every 100 parts by weight of the monomer mixture.

For production of the copolymer latex in the present invention, a conventional method of emulsion polymerization, for example, a method for conducting emulsion polymerization by adding the monomer mixture, a polymerization chain transfer agent, a polymerization initiator and an emulsifying agent to an aqueous medium such as water may be mentioned. The polymerization chain transfer agent can make use of a usual chain transfer agent generally known in emulsion polymerization.

Examples of chain transfer agents include mercaptocarboxylic acids such as 2-mercaptopropionic acid or salts thereof (e.g., ammonium mercaptoacetate), mercaptodicarboxylic acids such as mercaptosuccinic acid or salts thereof (e.g., mercaptodicarboxylates), mercaptans having a hydroxyl group in the molecule, such as 2-mercaptoethanol, mercaptans having an amino group in the molecule, such as 2-mercaptoethylamine, monosulfides having a carboxyl group in the molecule, such as thioglycolic acid and 3,3'-thiodipropionic acid or salts thereof, monosulfides a having hydroxyl group in the molecule, such as β-thiodiglycol, monosulfides having an amino group in the molecule, such as thiodiethyl amine, disulfides having a carboxyl group in the molecule, such as dithiodiglycolic acid and 2,2'-dithiodipropionic acid or salts thereof, acid anhydrides of monosulfides and disulfides, such as thiodiglycolic acid anhydride, disulfides having a carboxyl group and an amino group in the molecule, such as D-, L or D,L-cystine, halogenated hydrocarbons having a hydroxyl group in the molecule, such as chloromethanol and 2-chloroethanol, halogenated hydrocarbons having a carboxyl group in the molecule, such as monochloroacetic acid, dichloroacetic acid, chlorofumaric acid, chloromaleic acid and chloromalonic acid or salts thereof, acid anhydrides of halogenated hydrocarbons, such as chloromaleic acid anhydride, monothiols such as hexyl mercaptan, octyl mercaptan, n-dodecyl mercaptan and t-dodecyl mercaptan, dithiols such as 1,10-decane diol and triglycol dimercaptan, trithiols such as trimethylol propane tristhioglycolate, polythiols having at least 2 mercapto groups in the molecule, such as tetrathiols for example pentaerythritol tetrakisthioglycolate, xanthogen disulfides such as dimethyl xanthogen disulfide and diethyl xanthogen disulfide, thiuram disulfides such as tetramethyl thiuram disulfide, hydrocarbon halides such as carbon tetrachloride and carbon tetrabromide, alkyl mercaptocarboxylates such as 2-ethylhexyl mercaptoacetate and tridecyl mercaptopropionate, alkoxy alkyl mercaptocarboxylates such as methoxybutyl mercaptoacetate and methoxybutyl mercaptopropionate, mercaptoalkyl carboxylates such as 2-mercaptoethyl octanoate, and α-methyl styrene dimer, terpinolene, α-terpinene, γ-terpinene, dipentene, anisole and allyl alcohol.

These chain transfer agents are used singly or in combination thereof. In the present invention, monothiol, polythiol, xanthogen disulfide, thiuram disulfide, 2-ethylhexyl mercaptoacetate, 2-mercaptoethyl octanoate, methoxybutyl mercaptoacetate, methoxybutyl mercaptopropioate, α-methyl styrene dimer and terpinolene are preferably used.

In the present invention, the amount of these chain transfer agents used is usually in the range of 0.05 to 20 parts by weight, more preferably 0.1 to 15 parts by weight, most preferably 0.2 to 10 parts by weight relative to 100 parts by weight of the monomer mixture.

The polymerization initiator is not particularly limited, and inorganic persulfates such as potassium persulfate, sodium persulfate and ammonium persulfate, organic peroxides such as cumene hydroperoxide and benzoyl peroxide, and azo-type initiators such as azoisobutyronitrile may be used. These can be used alone or in combination thereof. Among these, peroxides showing a half-life of 10 hours at a temperature of 100° C. or more are preferably used. Further, in the present invention, the polymerization initiators described above can also be used as the so-called redox polymerization initiator by combination with a reducing agent such as sodium bisulfite and ferrous sulfate. In the present invention, the amount of the polymerization initiator used is usually about 0.01 to 5 parts by weight, preferably about 0.1 to 3 parts by weight, relative to 100 parts by weight of the total monomer mixture.

As the emulsifying agent used in emulsion polymerization, alkyl benzene sulfonates whose alkyl group contains 12 carbon atoms or less, such as sodium dodecyl benzene sulfonate and sodium octyl benzene sulfonate; alkyl diphenylether disulfonate such as disodium dodecyldiphenylether disulfonate; anionic surfactants such as sodium lauryl sulfate and α-sulfonated fatty acid salts, nonionic surfactants such as polyoxyethylene alkyl esters and polyoxyethylene alkyl aryl ethers, amphoteric surfactants of alkyl betaine salts, such as salts of lauryl betaine and stearyl betaine, and amphoteric surfactants of amino acid type, such as lauryl-β-alanine, lauryl di(aminoethyl) glycine and octyl di(aminoethyl) glycine can be used in combination with the fatty acid containing 8 to 22 carbon atoms or a salt thereof (A), the dialkylsulfosuccinate salt (B) of formula (1), and the alkyl benzene sulfonate (C) whose alkyl group contains 13 to 20 carbon atoms.

Among these emulsifying agents, sodium dodecylbenzene sulfonate and disodium dodecyldiphenylether disulfonate are preferably used. The amount of the emulsifying agent used is in the ratio of, usually 0.1 to 20 parts by weight, preferably 0.5 to 10 parts by weight.

The emulsion polymerization in the method of the present invention may be conducted in the presence of a chelating agent such as sodium ethylene diamine tetraacetate, a dispersant such as sodium formaldehyde sulfoxylate and an inorganic salt such as phosphates, if necessary.

For production of the copolymer latex (L) in the present invention, the emulsion polymerization is conducted usually at a temperature of 0 to 100° C. until the degree of polymerization of the monomer reaches 90%, preferably 95% or more. Preferably, the emulsion polymerization is conducted at 40° C. or less because the latex can be advantageously produced and a dip-molded product having high mechanical strength and soft feeling to the skin can be obtained.

As the method of emulsion polymerization, a method wherein the monomer component is added all at once to the polymerization system, and a polymerization method wherein the monomer component is added continuously or in divided portions to the polymerization system may be employed.

For production of the copolymer latex in the present invention, the emulsion polymerization is conducted preferably in the presence of a seed polymer having average particle diameter of 20 to 90 nm and Tg of −50 to 50° C. obtained previously by emulsion polymerization of ethylenically unsaturated monomers copolymerizable with the vinyl cyanide monomer.

The vinyl cyanide monomer used in polymerization for the seed includes acrylonitrile, methacrylonitrile, α-cyanoethyl acrylonitrile and fumaronitrile. These vinyl cyanide monomers may be used alone or in combination thereof. In the present invention, acrylonitrile can be preferably used. The ethylenically unsaturated monomers copolymerizable with this vinyl cyanide monomer include e.g. aromatic vinyl compounds such as styrene and α-methyl styrene, unsaturated alkyl carboxylates such as methyl acrylate, ethyl acrylate, butyl acrylate, 2-hydroxyethyl acrylate, methyl methacrylate, 2-hydroxyethyl methacrylate and glycidyl methacrylate, ethylenically unsaturated carboxylic acid amides such as acrylamide, methacrylamide, N,N-dimethyl acrylamide and N-methylol acrylamide, vinyl carboxylates such as vinyl acetate, ethylenically unsaturated amines such as methyl aminoethyl (meth)acrylate, dimethyl aminoethyl (meth)acrylate and 2-vinylpyridine, conjugated diene monomers such as 1,3-butadiene, isoprene, 2-chloro-1,3-butadiene and 2-methyl-1,3-butadiene, ethylenically unsaturated carboxylic acid monomers, for example monocarboxylic acids such (meth)acrylic acid and crotonic acid, dicarboxylic acids such as maleic acid, fumaric acid and itaconic acid, as well as anhydrides thereof, for example dicarboxylic acid monoesters i.e. half esters, such as methyl maleate and methyl itaconate. In the present invention, butyl acrylate is particularly preferably used.

The amount of the monomer mixture used for production of the seed polymer in the present invention is 0.5 to 10 parts by weight, preferably 1 to 5 parts by weight, relative to 100 parts by weight of the monomer mixture used for production of the copolymer latex.

In the emulsion polymerization for production of the seed polymer, surfactants such as anionic and nonionic surfactants may be used. The anionic surfactant includes e.g. sodium dodecyl benzene sulfonate, sodium octyl benzene sulfonate, sodium lauryl sulfate, α-sulfonated fatty acid salts etc. The nonionic surfactant includes e.g. polyoxyethylene alkyl esters, polyoxyethylene alkyl aryl ethers etc. Among these, sodium dodecyl benzene sulfonate is preferably used.

The amount of the surfactant used is 1 to 20% by weight, preferably 2 to 10% by weight, relative to the total amount of the monomer mixture used in polymerization for the seed.

The emulsion polymerization in production of the seed polymer may be conducted in the presence of a chelating agent such as sodium ethylene diamine tetraacetate, a dispersant such as sodium formaldehyde sulfoxylate and an inorganic salt such as phosphates.

The polymerization initiator used in production of the seed polymer may be the same as in emulsion polymerization of the monomer mixture as described above, and the amount of the initiator used is usually 0.1 to 10% by weight, preferably 0.5 to 7% by weight, relative to the total amount of the monomer mixture used in polymerization for the seed.

For production of the seed polymer in the present invention, a chain transfer agent, typically mercaptans, may be used, if necessary. Production of the seed polymer is conducted usually at a temperature of 20 to 80° C. until the degree of polymerization reaches 90%, preferably 95% or more.

The average particle diameter of the seed polymer is in the range of 20 to 90 nm, preferably 30 to 80 nm. If the average particle diameter of the seed polymer is less than 20 nm, it is difficult to attain a unimodal particle diameter for the resulting latex. On the other hand, if it is more than 90 nm, the particle diameter of the resulting latex is too large, and a too long time is required for the polymerization which is conducted until the degree of polymerization of the monomer mixture reaches 90%, preferably 95% or more.

The Tg of the seed polymer is in the range of −50 to 50° C., preferably −30 to 30° C. If it is lower than −50° C., the strength of the dip-molded product may be lowered, while if it exceeds 50° C., the dip-molded product may feel stiff.

This polymerization method using the seed is advantageous in that polymerization stability can be improved and that as compared with a conventional method of emulsion polymerization in the absence of a seed polymer, the number of particles during polymerization can be regulated by the seed polymer and thus the particle diameter of the resulting latex can be regulated.

The average particle diameter of the copolymer latex used in the present invention is preferably 80 to 200 nm, more preferably 90 to 180 nm. If the average particle diameter is less than 80 nm, the viscosity of the latex increases so that transportation of the latex may be hindered. On the other hand, if it exceeds 200 nm, coagulated materials are apt to generate during emulsion polymerization of the copolymer latex.

The gel content (methyl ethyl ketone-insolubles) in the copolymer latex used in the present invention is 51 to 90% by weight, preferably 51 to 80% by weight. If the gel content is too high, the molded product becomes too stiff and its feeling to the skin is deteriorated. On the other hand, if it is too low, the latex becomes increasingly thickened with an alkali, so that the viscosity of the copolymer latex may be increased excessively.

The gel content in the copolymer is determined by weighing a copolymer film obtained by drying the copolymer latex, immersing the film in methyl ethyl ketone, filtering it, weighing its dried insolubles, and calculating the ratio of the weight of the dried insolubles to the dry weight of the original film.

The swelling index (SI) of the methyl ethyl ketone-insolubles content in a copolymer obtained by drying the copolymer latex used in the present invention is preferably 10 or more and more preferably 15 or more. If the SI is less than 10, the strength of the dip-molded product may be diminished.

The SI is determined by obtaining a copolymer film by drying the copolymer latex, then immersing the film in methyl ethyl ketone, filtering it, measuring its wet weight, thereafter weighing its dry weight, and calculating the ratio of the dry weight to the wet weight.

The weight average molecular weight, as determined using polystyrene standards, of the tetrahydrofuran-soluble sol content in a dried film obtained from the copolymer latex used in the present invention is 50,000 to 300,000 and the number average molecular weight as determined using polystyrene standards is preferably 10,000 to 100,000, and the degree of dispersion is preferably 10 or less. If the weight average molecular weight is less than 50,000, or the number average molecular weight is less than 10,000, then the resulting dip-molded product, particularly when it is in the form of a thin film, may not only have a uneven film thickness but also be poor in strength. On the other hand, if the weight average molecular weight is more than 300,000, or the number average molecular weight is more than 100,000, significant shrinkage may occur during dip molding.

In addition, if the ratio of the number average molecular weight to the weight average molecular weight, that is, the degree of dispersion, is more than 10, then shrinkage becomes significant during dip molding process and the molded product may feel stiff.

The weight and the number average molecular weights of the tetrahydrofuran-soluble sol content in a film obtained from the copolymer latex used in the present invention are those determined by gel permeation chromatography. Specifically, a film was prepared from the copolymer latex, then the film was immersed in tetrahydrofuran, and the tetrahydrofuran-soluble sol therein was measured by gel permeation using polystyrene standards.

The bubble breaker (A) used in the present invention is a fatty acid containing 8 to 22 carbon atoms or a salt thereof. Examples of the fatty acid includes e.g. saturated fatty acids such as caprylic acid, capric acid, lauric acid, tridecyl acid, myristic acid, pentadecyl acid, nonyl acid, stearic acid and behenic acid and unsaturated fatty acids such as oleic acid, elaidic acid, linolic acid and linolenic acid.

Among these fatty acids, those having 12 to 20 carbon atoms are preferable, and those having 14 to 18 carbon atoms are more preferable.

Although elements constituting their salts are not particularly limited, alkali metals such as lithium, potassium and sodium, alkaline earth metals such as calcium and barium, and ammonium are mentioned, among which sodium, potassium, calcium and ammonium are preferably used, and sodium is more preferably used.

The amount of the bubble breaker (A) used is usually 0.05 to 5 parts by weight, preferably 0.5 to 3 parts by weight, more preferably 1 to 2 parts by weight, relative to 100 parts by weight of the monomer mixture. If it is less than 0.05 part by weight, the resulting latex compound may be not only high in the chemical stability to a coagulant but also poor in wettability to the surface of a mold and further, bubbles in the latex compound will not disappear and cause pinholes in the dip-molded product, or the product becomes sticky. On the other hand, if it is more than 5 parts by weight, oily components may float in the latex, thus deteriorating the mechanical stability of the latex compound for dip molding into which a vulcanizing agent has been incorporated.

The bubble breaker is preferably a mixture of fatty acid salts. If particularly $C_{18}$ stearic acid or its salts are contained in an amount of 15 to 50% by weight, more preferably 30 to 45 by weight, the resulting dip-molded product is free of pinholes, is excellent in oil resistance and mechanical strength, and has uniform film thickness and soft feeling.

These bubble breakers (A) may be used during emulsion polymerization or after emulsion polymerization (when the degree of polymerization of the monomer mixture reaches 95% or more), but they are effective when added after emulsion polymerization.

The component (B) is a dialkylsulfosuccinate salt represented by formula (1):

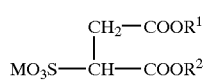
(1)

wherein $R^1$ and $R^2$ are the same or different and represent an alkyl group containing 5 to 12 carbon atoms and M is metal ion or ammonium ion.

The alkyl group containing 5 to 12 carbon atoms represented by $R^1$ and $R^2$ in the formula includes e.g. straight-chain alkyl such as amyl, hexyl, heptyl, octyl and nonyl and branched alkyl such as 1,3-dimethyl butyl and 1-methyl amyl.

The esters of formula (1) include esters whose alkyl groups contain 10 carbon atoms in total, such as di-n-amyl, di-1-methyl butyl, di-2-methyl butyl, diisoamyl and di-1,3-dimethylbutyl groups, esters whose alkyl groups contain 12 carbon atoms in total, such as di-n-hexyl and di-1-methylamyl groups, esters whose alkyl groups contain 14 carbon atoms in total, such as di-n-heptyl, di-dimethylamyl, di-1-isopropylisobutyl, di-1-propylbutyl and di-1-methylhexyl groups, esters whose alkyl groups contain 16 carbon atoms in total, such as di-n-octyl, mono-hexylmonodecyl, mono-2-ethylhexyl-mono-1-methylpentyl, di-2-ethylhexyl, di-1-methylheptyl groups, esters whose alkyl group contain 17 carbon atoms in total, such as mono-2-ethylhexyl-mono-1-methyl-4-ethylhexyl group, esters whose alkyl groups contain 18 carbon atoms in total, such as di-n-nonyl, di-1-butylamyl, di-isobutyl-3-methylbutyl and di-1-methyl-4-ethylhexyl groups, and esters whose alkyl groups contain 22 carbon atoms in total, such as di-1-methyl-4-ethyloctyl group, among which those esters having a di-n-octyl or di-n-nonyl group are particularly preferable.

The metal represented by M in the formula (1) includes alkali metals such as lithium, potassium and sodium, alkaline earth metals such as calcium and barium, zinc group metals such as zinc and cadmium, carbon group metals such as tin and lead, and ammonium, among them, sodium and potassium are preferably used.

The amount of the used dialkylsulfosuccinate salt represented by the formula (1) is 0.1 to 5 parts by weight, preferably 0.2 to 3 parts by weight, more preferably 0.5 to 1.5 parts by weight, relative to 100 parts by the monomer mixture. If it is less than 0.1 part by weight, the latex compound may be poor in wettability to the surface of a mold, whereas if it is more than 5 parts by weight, bubbles are likely generated in the latex compound.

These dialkylsulfosuccinate salts may be used before and/or during emulsion polymerization or after emulsion polymerization (when the degree of polymerization of the monomer mixture reaches 95% or more).

Component (C) is an alkyl benzene sulfonate whose alkyl group contains 13 to 20 carbon atoms. The alkyl benzene sulfonic acids include e.g. tetradecyl benzene sulfonic acid whose alkyl group contains 14 carbon atoms, pentadecyl benzene sulfonic acid whose alkyl group contains 15 carbon atoms, hexadecyl benzene sulfonic acid whose alkyl group contains 16 carbon atoms and octadecyl benzene sulfonic acid whose alkyl group contains 18 carbon atoms.

Out of these alkyl benzene sulfonic acids, those whose alkyl group contains 13 to 18 carbon atoms are preferably used, and those whose alkyl group contains 14 to 17 carbon atoms are more preferably used. Salts thereof, that is, sulfonates, are not particularly limited, and the examples include salts of alkali metals such as lithium, potassium and sodium, salts of alkaline earth metals such as calcium and barium, and ammonium salts.

Out of these salts, sodium, potassium, calcium and ammonium salts are preferably used, among them, sodium salts are particularly preferable.

The amount of the alkyl benzene sulfonate used is usually 0.5 to 10 parts by weight, preferably 1.0 to 7 parts by weight, more preferably 2.0 to 5.0 parts by weight, relative to 100 parts by weight of the monomer mixture. If it is less than 0.5 part by weight, the stability in the polymerization of copolymer latex may not be satisfactory so that coagulated substance may be generated, or the latex compound may be poor in wettability to a mold. On the other hand, if its content is higher than 10 parts by weight, bubbles mixed in the latex compound will not disappear and these bubbles may cause pinholes in the dip-molded product.

When a pH adjuster is used for production of the latex compound for dip molding according to the present invention, an alkaline material such as ammonia, sodium hydroxide, potassium hydroxide or the like may be used.

The pH of the latex compound for dip molding is usually adjusted to the range of 5 to 11, preferably 7 to 10. If the pH value is less than 5, the mechanical stability of the resulting latex compound for dip molding is lowered. On the other hand, if the pH value exceeds 11, the strength of the dip-molded product may be lowered.

By incorporating a thickener into the latex compound for dip molding according to the present invention, the viscosity of the compound for dip molding can be improved. The thickener includes e.g. animal thickeners such as casein, glue and gelatin, plant thickeners such as alginates, starch and gum arabic, mineral thickeners such as bentonite, polymer thickeners such as polycarboxylates, acrylic copolymers, cross-linked acrylic copolymers, polyvinyl alcohol and polyacrylamide polyethylene oxide, cellulose derivatives such as carboxylated methyl cellulose, methyl cellulose, hydroxypropyl methyl cellulose, hydroxyethyl cellulose, cellulose xanthogenate and carboxylated starch, and cationic thickeners such as cetyl trimethyl ammonium bromide and cetyl pyridinium bromide. In particular, the polymer thickeners are preferably used, and the carboxylic acid-containing cross-linked acrylic emulsion is more preferably used. The amount of these thickeners used is usually 0.01 to 1.0 part by weight, preferably 0.02 to 0.1 part by weight, relative to 100 parts by weight of the monomer mixture. If the viscosity of the latex compound for dip molding according to the present invention is lower, there may run down on a mold after dipping in latex compound, but this can be solved by adding a thickener to the compound. However, if the amount of the thickener used is more than 1.0 part by weight, the viscosity of the latex compound for dip molding becomes high so that the component (A) may fail to exhibit the effect of breaking bubbles, thus permitting bubbles to generate pinholes.

In order to obtain a dip-molded product from the latex compound for dip molding according to the present invention, it is possible to employ any known dip molding techniques such as direct dip process, anode coagulant dip process and the Teague coagulant dip process.

The anode coagulant dip process suitable for production of e.g. surgical gloves will be described.

First, the mold is dipped in a coagulant, then raised and dried until the surface of the mold is almost dry. This coagulant is prepared by dissolving calcium salts such as calcium chloride, calcium nitrate and calcium acetate in water, a hydrophilic organic solvent such as alcohol and ketone, or a mixture thereof The concentration of the calcium salts in this coagulant is usually 5 to 50% by weight, preferably 10 to 30% by weight. The coagulant may, if necessary, contain, for example, surfactants such as nonionic and anionic surfactants, for example fillers such as calcium carbonate, talc and silica gel.

Then, the mold is dipped in the latex compound for dip molding and then raised whereby the latex compound is allowed to be coagulated on the mold, whereupon the latex compound reacts with the coagulant, to form a rubber-like film on the mold. This film is washed with water, then dried and stripped from the mold to give a dip-molded product.

The latex compound for dip molding according to the present invention may, if necessary, contains rubber latex such as natural rubber latex and isoprene rubber latex, a vulcanizing agent such as colloidal sulfur and thiuram disulfide, vulcanization accelerators such as dialkyl dithiocarbamate and xanthogenate, vulcanization accelerator activators such as zinc white, litharge (PbO), red lead oxide ($Pb_3O_4$) and magnesium oxide, fillers such as phthalic anhydride, benzoic acid, salicylic acid and magnesium carbonate, anti-oxidants such as styrenated phenol, imidazoles and p-phenylene diamine, and coloring agents such as fast yellow, phthalocyanine blue and ultramarine.

EXAMPLES

The present invention will be described in more detail by reference to the Examples and Comparative Examples, which are however not intended to limit the present invention. In the Examples and Comparative Examples, the terms "part" and "%" are on a weight basis unless otherwise noted.

Materials used:

Among the starting materials used in the Examples and Comparative Examples, the compounds or compositions shown in Tables 1 to 3 were used as the bubble breaker (A), the dialkylsulfosuccinate salt (B) and the alkyl benzene sulfonate (C), respectively.

(1) Composition of the Bubble Breaker (A) and Antifoaming Agents

TABLE 1

| | Number of carbons in alkyl group | Composition of bubble breaker (A) (parts) | | | | | | Antifoaming agent (parts) | |
| --- | --- | --- | --- | --- | --- | --- | --- | --- | --- |
| | | (a1) | (a2) | (a3) | (a4) | (a5) | (a6) | (a7) | (a8) |
| Sodium laurate | 12 | | | 20 | 15 | 5 | 10 | | |
| Sodium myristate | 14 | | | 20 | 10 | 10 | 10 | | |
| Sodium palmitate | 16 | | 100 | 5 | 15 | 25 | 30 | | |
| Sodium stearate | 18 | 100 | | 45 | 40 | 30 | 30 | | |
| Sodium oleate | 18 | | | 10 | 20 | 30 | 20 | | |
| Silicon type antifoaming agent*1 | | | | | | | | 100 | |
| Polyether type antifoaming agent*2 | | | | | | | | | 100 |

*1KM-73 (Shin-Etsu Silicon Co., Ltd., JP)
*2SN777 (Sunnopco Co., Ltd., JP)

(2) Dialkylsulfosuccinate Salt (B)

TABLE 2

| | Number of total carbon atoms in alkyl group | Symbol |
|---|---|---|
| Sodium dihexylsulfosuccinate | 12 | (b1) |
| Sodium dioctylsulfosuccinate | 16 | (b2) |
| Sodium dinonylsulfosuccinate | 18 | (b3) |
| Sodium di-2-ethylhexylsulfosuccinate | 16 | (b4) |

(3) Alkyl benzene sulfonate (C)

TABLE 3

| | Number of carbon atoms in alkyl group | Symbol |
|---|---|---|
| Sodium pentadecyl benzene sulfonate | 15 | (c1) |
| Sodium hexadecyl benzene sulfonate | 16 | (c2) |
| Sodium octadecyl benzene sulfonate | 18 | (c3) |

(4) Seed Polymer (S)

In the composition shown in Table 4 below, the starting materials other than potassium persulfate were introduced into a reaction vessel, and when the temperature was raised to 60° C., potassium persulfate was added thereto. The mixture was allowed to react for 1 hour under stirring and then cooled to 30° C. to give seed polymer emulsions (s1) to (s3). The composition of the starting materials, the Tg (°C.) and the particle diameters of the resulting seed polymers are shown in Table 4.

TABLE 4

| Composition of the starting materials of seed polymer (S) | | | |
|---|---|---|---|
| | (s1) | (s2) | (s3) |
| Composition (parts) | | | |
| Water | 100 | 100 | 100 |
| Sodium dodecyl benzene sulfonate | 0.1 | 0.075 | 0.05 |
| Acrylonitrile | 1.7 | 1 | 1.5 |
| Butyl acrylate | 0.3 | 0.3 | 0.2 |
| Styrene | | 0.7 | 0.3 |
| Potassium persulfate | 0.1 | 0.1 | 0.1 |
| Physical properties | | | |
| Tg (° C.) | −33 | −33 | −20 |
| Particle diameter (nm) | 60 | 65 | 70 |

Example 1

(1) Preparation of a Copolymer Latex Composition 59 parts of 1,3-butadiene, 36 parts of acrylonitrile, 5 parts of methacrylic acid, 200 parts of water, 3 parts of sodium dodecyl benzene sulfonate and 0.5 part of t-dodecyl mercaptan were introduced into a 5-L autoclave where the atmosphere had been replaced with nitrogen. Then, 0.05 part of ferrous sulfate and 0.1 part of cumene hydroperoxide were added thereto and the mixture was reacted at 35° C. under stirring.

When the degree of polymerization reached 95% or more after the mixture was reacted for 18 hours, the reaction mixture was adjusted to pH 8.5±0.2 with ammonia water. Further, 1 part of composition (a1) for the bubble breaker (A) shown in Table 1 was added.

Steam was introduced into the reaction mixture to remove the unreacted monomer, and the solid content of the latex was concentrated to 45%, to give the desired copolymer latex composition. The composition and physical properties of the copolymer latex composition are shown in Table 5.

TABLE 5

| Composition and physical properties of the copolymer latex composition | | | | | | | | | |
|---|---|---|---|---|---|---|---|---|---|
| | Examples | | | | | | | | |
| | 1 | 2 | 3 | 4 | 5 | 6 | 7 | 8 | 9 |
| Latex composition (parts) | | | | | | | | | |
| Acrylonitrile | 36 | 36 | 36 | 36 | 36 | 36 | 36 | 36 | 36 |
| Butadiene | 59 | 59 | 59 | 59 | 59 | 59 | 59 | 59 | 59 |
| Methacrylic acid | 5 | 5 | 5 | 5 | 5 | 5 | 5 | 5 | 5 |
| t-dodecyl mercaptan | 0.5 | 0.5 | 0.5 | 0.5 | 0.5 | 0.5 | 0.5 | 0.5 | 0.5 |
| Sodium dodecyl benzene sulfonate | 3 | 3 | 3 | 3 | 3 | 3 | 3 | 3 | |
| Disodium dodecyldiphenylether disulfonate | | | | | | | | | 3 |
| Polyhydroxy compound*1 | | | | | 5 | 5 | 5 | 5 | 5 |
| Bubble breaker, component (A) | (a 1) | 1 | | | | | | | |
| | (a 2) | | 1 | | | | | | |
| | (a 3) | | | 1 | | 1.25 | | | |
| | (a 4) | | | | 1 | | 1.25 | | 1.25 |
| | (a 5) | | | | | | | 1.25 | |
| | (a 6) | | | | | | | | 1.25 |
| Antifoaming agent | (a 7)*2 | | | | | | | | |
| | (a 8)*3 | | | | | | | | |

TABLE 5-continued

Composition and physical properties of the copolymer latex composition

Physical properties

| | | | | | | | | | |
|---|---|---|---|---|---|---|---|---|---|
| Solid content (%) | 45 | 45 | 45 | 45 | 45 | 45 | 45 | 45 | 45 |
| PH | 8.5 | 8.4 | 8.6 | 8.5 | 8.6 | 8.6 | 8.6 | 8.5 | 8.5 |
| Average particle diameter (nm) | 145 | 145 | 145 | 145 | 148 | 148 | 148 | 148 | 144 |
| Gel content (%) | 65 | 65 | 65 | 65 | 60 | 60 | 60 | 60 | 61 |
| SI value | 15 | 15 | 15 | 15 | 15 | 15 | 15 | 15 | 15 |
| Weight average molecular weight | 135000 | 135000 | 135000 | 135000 | 125000 | 125000 | 125000 | 125000 | 135000 |
| Number average molecular weight | 43000 | 43000 | 43000 | 43000 | 42000 | 42000 | 42000 | 42000 | 43000 |
| Degree of dispersion | 3.1 | 3.1 | 3.1 | 3.1 | 3.0 | 3.0 | 3.0 | 3.0 | 3.1 |

| | | Comparative Examples | | | | |
|---|---|---|---|---|---|---|
| | | 1 | 2 | 3 | 4 | 5 |
| Latex composition (parts) | | | | | | |
| Acrylonitrile | | 36 | 36 | 36 | 36 | 36 |
| Butadiene | | 59 | 59 | 59 | 59 | 59 |
| Methacrylic acid | | 5 | 5 | 5 | 5 | 5 |
| t-dodecyl mercaptan | | 0.5 | 0.5 | 0.5 | 0.5 | 0.5 |
| Sodium dodecyl benzene sulfonate | | 3 | 3 | 3 | 3 | 3 |
| Disodium dodecyldiphenylether disulfonate | | | | | | |
| Polyhydroxy compound*1 | | | 5 | 5 | 5 | 5 |
| Bubble breaker component (A) | (a 1) | 7 | | | | |
| | (a 2) | | | | | |
| | (a 3) | | | | | |
| | (a 4) | | | | | |
| | (a 5) | | | 7 | | |
| | (a 6) | | | | | |
| Antifoaming agent | (a 7)*2 | | | | 1 | |
| | (a 8)*3 | | | | | 1 |
| Physical properties | | | | | | |
| Solid content (%) | | 45 | 45 | 45 | 45 | 45 |
| PH | | 8.5 | 8.5 | 8.5 | 8.4 | 8.4 |
| Average particle diameter (nm) | | 145 | 148 | 148 | 148 | 148 |
| Gel content (%) | | 65 | 60 | 60 | 60 | 60 |
| SI value | | 15 | 15 | 15 | 15 | 15 |
| Weight average molecular weight | | 135000 | 125000 | 125000 | 125000 | 125000 |
| Number average molecular weight | | 43000 | 42000 | 42000 | 42000 | 42000 |
| Degree of dispersion | | 3.1 | 3.0 | 3.0 | 3.0 | 3.0 |

*1Propylene glycol,
*2Silicon type antifoaming agent,
*3Polyether type antifoaming agent

(2) Preparation of a Latex Compound for Dip Molding

The following latex compounding ingredients were added to the copolymer latex composition obtained above to give a compound for dip molding.

| Latex compound for dip molding | |
|---|---|
| Copolymer latex composition (solid content) | 100.0 parts |
| Zinc white | 1.5 parts |
| Colloidal sulfur | 1.0 part |
| Zinc di-n-butyldithiocarbamate | 0.3 part |
| Titanium oxide | 3.0 parts |
| Solid content | 35% |

(3) Production of a Dip-molded Product

Separately, 15% aqueous calcium nitrate solution was prepared as a coagulant. A mold for gloves preliminarily dried at 80° C. was dipped in this solution for 2 seconds, then raised and dried while rotating it horizontally (80° C.×2 minutes). Subsequently, the mold for gloves was dipped for 2 seconds in the latex compound for dip molding, then raised and dried while rotating it horizontally (80° C.×2 minutes). Then, the mold for gloves was dipped in warm water at 40° C. for 3 minutes, washed and heated at 130° C. for 20 minutes to give a film on the surface of the mold for gloves. Finally, this film was stripped from the mold for gloves to give a glove-shaped dip-molded product.

The evaluation results of the dip-molded product thus obtained are shown in Table 6.

Examples 2 to 9

Dip-molded products were obtained from the starting materials shown in Table 5 in the same manner as in Example 1. The evaluation results are shown in Table 6.

Comparative Example 1

A copolymer latex composition was produced from the starting materials shown in Table 5 in the same manner as in Example 1. The bubble breaker (A) was not added.

Comparative Example 2

A copolymer latex composition was produced from the starting materials shown in Table 5 in the same manner as in Example 1. As the bubble breaker (A), 7 parts by weight of (a1) were added.

Comparative Example 3

A copolymer latex composition was produced from the starting materials shown in Table 5 in the same manner as in Example 1. As the bubble breaker (A), 7 parts of (a5) were added.

Comparative Example 4

A copolymer latex composition was produced from the starting materials shown in Table 5 in the same manner as in Example 1. 1 part of the antifoaming agent (a7) was added in place of the bubble breaker (A).

Comparative Example 5

A copolymer latex composition was produced from the starting materials shown in Table 5 in the same manner as in Example 1. 1 part of the antifoaming agent (a8) was added in place of the bubble breaker (A).

Dip-molded products were obtained in the same manner as in Example 1 from the copolymer latex compositions obtained in Comparative Examples 1 to 5. The evaluation results are shown in Table 6.

As is evident from Table 6, the latex compounds for dip molding in Examples 1 to 9 where component (A) was blended were excellent in appearance and chemical stability of latex compound to a coagulant, and their molded products gave good results in all items of feeling, pinholes and stickiness resistance. On the other hand, the latex compounds for dip molding in Comparative Example 1 where component (A) was not blended and in Comparative Examples 4 and 5 where a antifoaming agent other than component (A) was blended were inferior in appearance and chemical stability of latex compound to a coagulant, and their molded products were problematic for pinholes and stickiness resistance.

Further, the molded products in Comparative Examples 2 and 3 where component (A) was excessively blended were excellent in stickiness resistance, but the latex compounds for dip molding were inferior in appearance, and the molded products were problematic for pinholes.

Example 10

(1) Preparation of a Copolymer Latex Composition

All the ingredients for seed polymer (s1) shown in Table 4 were introduced into a 5-L autoclave where the atmosphere had been replaced by nitrogen. Then, 65 parts of 1,3-butadiene, 30 parts of acrylonitrile, 5 parts of methacrylic acid, 100 parts of water, 5 parts of propylene glycol, 2 parts of sodium dodecyl benzene sulfonate, 0.5 part of sodium dihexylsulfosuccinate (b1) in component (B) shown in Table 2, and 0.5 part of t-dodecyl mercaptan were introduced into the autoclave. 0.05 part of ferrous sulfate and 0.1 part of cumene hydroperoxide were added thereto as reaction initiators, and the mixture was reacted at 35° C. under stirring.

Then, a copolymer latex composition was obtained in the same manner as in Example 1. The composition and physical properties of the copolymer latex Composition are shown in Table 7.

TABLE 6

Physical properties of latex compounds for dip molding and dip-molded products

| Evaluation item | | Examples | | | | | | | | | Comparative Examples | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Appearance of latex compound for molding | | ○ | ○ | ○ | ○ | ○ | ○ | ○ | ○ | ○ | ○ | X | X | Δ | Δ |
| Chemical stability of latex compound to a coagulant | | ○ | ○ | ○ | ○ | ○ | ○ | ○ | ○ | ○ | X | Δ | Δ | X | X |
| Thickness of gloves (mm) | | 0.11 | 0.11 | 0.11 | 0.11 | 0.11 | 0.11 | 0.11 | 0.11 | 0.11 | 0.12 | 0.11 | 0.12 | 0.12 | 0.12 |
| Oil resistance | Kerosene (%) | 105 | 105 | 102 | 103 | 104 | 104 | 102 | 102 | 104 | 105 | 106 | 109 | 108 | 107 |
| | Gasoline (%) | 112 | 114 | 110 | 112 | 113 | 112 | 110 | 110 | 112 | 113 | 115 | 118 | 119 | 119 |
| | Toluene (%) | 120 | 122 | 116 | 115 | 119 | 120 | 115 | 115 | 119 | 122 | 122 | 125 | 125 | 126 |
| Feeling: 300% modulus (MPa) | | 1.9 | 2.0 | 1.9 | 1.9 | 1.7 | 1.7 | 1.6 | 1.6 | 1.7 | 1.6 | 1.8 | 1.9 | 1.9 | 1.9 |
| Pinholes | | ○ | ○ | ⊙ | ⊙ | ⊙ | ⊙ | ⊙ | ⊙ | ⊙ | X | X | X | X | X |
| Stickiness resistance | | ○ | ○ | ○ | ○ | ○ | ○ | ○ | ○ | ○ | X | ⊙ | ⊙ | X | X |

TABLE 7

Compositions and physical properties of the copolymer latex composition

|  |  | Examples | | | | | | Comparative Examples | | |
| --- | --- | --- | --- | --- | --- | --- | --- | --- | --- | --- |
|  |  | 10 | 11 | 12 | 13 | 14 | 15 | 6 | 7 | 8 |
| Latex composition (parts) | | | | | | | | | | |
| Seed polymer | | (s 1) | (s 1) | (s 2) | (s 2) | (s 3) | (s 3) | (S 1) | (s 1) | (s 1) |
| Acrylonitrile | | 30 | 30 | 30 | 30 | 30 | 30 | 30 | 30 | 30 |
| Butadiene | | 65 | 65 | 65 | 65 | 65 | 65 | 65 | 65 | 65 |
| Methacrylic acid | | 5 | 5 | 5 | 5 | 5 | 5 | 5 | 5 | 5 |
| t-dodecyl mercaptan | | 0.5 | 0.5 | 0.5 | 0.5 | 0.5 | 0.5 | 0.5 | 0.5 | 0.5 |
| Sodium dodecyl benzene sulfonate | | 2 | 2 | 3 | 3 | 3 | 3 | 2 | 2 | 2 |
| Polyhydroxy compound*[1] | | 5 | 5 | 5 | 5 | 5 | 5 | 5 | 5 | 5 |
| Thickener*[2] | | | | | | 0.05 | 0.1 | | | |
| Component (A) | (a 3) | 1 | | | | 1.5 | 1.5 | | | 7 |
|  | (a 4) | | 1 | | | | | | | |
|  | (a 5) | | | 1 | | | | | | |
|  | (a 6) | | | | 1 | | | | | |
| Component (B) | (b 1) | 0.5 | | | | | | | 0.5 | 0.5 |
|  | (b 2) | | 0.5 | | | 1 | 1 | | | |
|  | (b 3) | | | 0.5 | | | | | | |
|  | (b 4) | | | | 0.5 | | | | | |
| Physical properties | | | | | | | | | | |
| Solid content (%) | | 45 | 45 | 45 | 45 | 45 | 45 | 45 | 45 | 45 |
| PH | | 8.5 | 8.4 | 8.6 | 8.6 | 8.5 | 8.5 | 8.5 | 8.5 | 8.5 |
| Average particle diameter (nm) | | 140 | 140 | 155 | 155 | 170 | 170 | 140 | 140 | 140 |
| Gel content (%) | | 55 | 53 | 55 | 57 | 59 | 59 | 55 | 55 | 55 |
| SI value | | 20 | 15 | 15 | 17 | 20 | 22 | 22 | 22 | 22 |
| Weight average molecular weight | | 120000 | 120000 | 135000 | 135000 | 140000 | 135000 | 125000 | 125000 | 125000 |
| Number average molecular weight | | 41000 | 40000 | 42000 | 45000 | 47000 | 43000 | 41000 | 42000 | 42000 |
| Degree of dispersion | | 2.9 | 3.0 | 3.2 | 3.0 | 3.0 | 3.1 | 3.0 | 3.0 | 3.0 |

*[1]Propylene glycol
*[2]ASE-95 (Nippon Acryl Kagaku Co., Ltd. JP)

(2) Production of Dip-molded Product

A dip-molded product was obtained in the same manner as in item (3) in Example 1 from the copolymer latex composition obtained in Example 10. The evaluation results are shown in Table 8.

Examples 11 to 13

Dip-molded products were obtained from the starting materials shown in Table 7 in the same manner as in Example 10. The evaluation results are shown in Table 8.

Examples 14 and 15

Dip-molded products were obtained from the starting materials shown in Table 7 in the same manner as in Example 10. The evaluation results are shown in Table 8. However, a thickener ASE-95 (Nippon Acryl Kagaku Co., Ltd.) was added in amounts of 0.05 and 0.1 part in Examples 14 and 15 respectively to prepare copolymer latex compositions.

Comparative Example 6

A copolymer latex composition was produced by emulsion polymerization in the same manner as in Example 10 except that the monomer composition shown in Table 7 and propylene glycol were used in the polymerization. However, the component (A) and the dialkylsulfosuccinate salt (B) were not added.

Comparative Example 7

A copolymer latex composition was produced by emulsion polymerization in the same manner as in Example 10 except that the monomer composition shown in Table 7 and propylene glycol were used in the polymerization. However, 0.5 part of (b1) in component (B) was added and the bubble breaker (A) was not added.

Comparative Example 8

A copolymer latex composition was produced by emulsion polymerization in the same manner as in Example 10 except that the monomer composition shown in Table 7 and propylene glycol were used in the polymerization. However, 7 parts of (a3) in component (A) and 0.5 part of (b 1) in component (B) were added.

Dip-molded products were obtained in the same manner as in Example 10 from the copolymer latex components obtained in Comparative Examples 6 to 8. The evaluation results are shown in Table 8.

TABLE 8

Physical properties of the latex compounds for dip molding and dip-molded products

| Evaluation items | Examples | | | | | | Comparative Examples | | |
|---|---|---|---|---|---|---|---|---|---|
| | 10 | 11 | 12 | 13 | 14 | 15 | 6 | 7 | 8 |
| Appearance of latex compound for molding | ○ | ○ | ○ | ○ | ○ | ○ | ○ | ○ | X |
| Chemical stability of compound to coagulant | ○ | ○ | ○ | ○ | ⊙ | ⊙ | X | Δ | Δ |
| Thickness of gloves (mm) | 0.11 | 0.11 | 0.11 | 0.11 | 0.11 | 0.11 | 0.12 | 0.11 | 0.12 |
| Oil resistance  Kerosene (%) | 110 | 110 | 112 | 113 | 110 | 109 | 118 | 117 | 119 |
| Gasoline (%) | 115 | 114 | 116 | 116 | 114 | 115 | 116 | 117 | 116 |
| Toluene (%) | 125 | 124 | 125 | 126 | 120 | 120 | 127 | 122 | 127 |
| Feeling: 300% modulus (MPa) | 1.6 | 1.5 | 1.6 | 1.6 | 1.5 | 1.5 | 1.5 | 1.6 | 1.6 |
| Pinholes | ⊙ | ⊙ | ⊙ | ⊙ | ⊙ | ⊙ | X | X | X |
| Stickiness resistance | ○ | ○ | ○ | ○ | ○ | ○ | X | X | ⊙ |

As is evident from Table 8, any latex compounds for dip molding in Examples 10 to 15 where the components (A) and (B) were blended were superior in appearance and chemical stability of latex compound to a coagulant, and their molded products were excellent in the items of pinholes and stickiness resistance, and significant improvements were recognized particularly with respect to pinholes. The molded products in Comparative Example 6 where the components (A) and (B) were not added and in Comparative Example 7 where the component (B) only was blended, were problematic in respect of pinholes and stickiness resistance. The component for dip molding in Comparative Example 8 where the component (A) only was excessively blended was inferior in appearance and chemical stability of latex component, and its molded product was problematic for pinholes.

Examples 16 to 18

Copolymer latex compositions and latex compounds for dip molding were prepared from the starting materials shown in Table 9 in the same manner as in Example 10. Further, dip-molded products were obtained in the same manner as in Example 1. The evaluation results of the resulting dip-molded products are shown in Table 10.

Examples 19 to 21

Copolymer latex compositions and latex compounds for dip molding were prepared from the starting materials shown in Table 9 in the same manner as in Example 10. Then, dip-molded products were obtained in the same manner as in Example 1. The evaluation results of the resulting dip-molded products are shown in Table 10.

Comparative Example 9

A copolymer latex composition was produced from the starting materials shown in Table 9 by emulsion polymerization in the same manner as in Example 10. The bubble breaker (A) and the dialkylsulfosuccinate salt (B) were not added.

Comparative Example 10

A copolymer latex composition was produced from the starting materials shown in Table 9 by emulsion polymerization in the same manner as in Example 10. The bubble breaker (A) was not added, and 0.5 part of (b1) in component (B) and 3 parts of (c1) in the component (C) were added.

Comparative Example 11

A copolymer latex composition was produced from the starting materials shown in Table 9 by emulsion polymerization in the same manner as in Example 10. In this comparative example, 7 parts of (a3) in the component (A), 0.5 part of (b1) in the component (B) and 3 parts of (c1) in the component (C) were added. Then, a dip-molded product was prepared in the same manner as in Example 10. The evaluation results of the resulting dip-molded product are shown in Table 10.

TABLE 9

Compositions and physical properties of copolymer latex composition

| | Examples | | | | | | Comparative Examples | | |
|---|---|---|---|---|---|---|---|---|---|
| | 16 | 17 | 18 | 19 | 20 | 21 | 9 | 10 | 11 |
| Latex composition (parts) | | | | | | | | | |
| Seed polymer | s1 | s2 | s1 | s2 | s2 | s2 | s1 | s1 | s1 |
| Acrylonitrile | 30 | 30 | 30 | 30 | 30 | 30 | 30 | 30 | 30 |
| Butadiene | 65 | 65 | 65 | 65 | 65 | 65 | 65 | 65 | 65 |
| Methacrylic acid | 5 | 5 | 5 | 5 | 5 | 5 | 5 | 5 | 5 |
| t-dodecyl mercaptan | 0.5 | 0.5 | 0.5 | 0.5 | 0.5 | 0.5 | 0.5 | 0.5 | 0.5 |
| Polyhydroxy compound*1 | 5 | 5 | 5 | 5 | 5 | 5 | 5 | 5 | 5 |

TABLE 9-continued

Compositions and physical properties of copolymer latex composition

|  |  | Examples |  |  |  |  |  | Comparative Examples |  |  |
|---|---|---|---|---|---|---|---|---|---|---|
|  |  | 16 | 17 | 18 | 19 | 20 | 21 | 9 | 10 | 11 |
| Component (A) | (a 3) | 1 |  |  | 1 |  |  |  |  | 7 |
|  | (a 4) |  | 1 |  |  | 1 |  |  |  |  |
|  | (a 5) |  |  | 1 |  |  |  |  |  |  |
|  | (a 6) |  |  |  |  |  | 1 |  |  |  |
| Component (B) | (b 1) |  |  |  | 0.5 |  |  |  | 0.5 | 0.5 |
|  | (b 2) |  |  |  |  | 0.5 |  |  |  |  |
|  | (b 3) |  |  |  |  |  |  |  |  |  |
|  | (b 4) |  |  |  |  |  | 1 |  |  |  |
| Component (C) | (c 1) | 3 |  |  | 3 |  |  | 3 | 3 | 3 |
|  | (c 2) |  | 3 |  |  | 3 |  |  |  |  |
|  | (c 3) |  |  | 3 |  |  | 3 |  |  |  |
| Physical properties |  |  |  |  |  |  |  |  |  |  |
| Solid content (%) |  | 45 | 45 | 45 | 45 | 45 | 45 | 45 | 45 | 45 |
| pH |  | 8.5 | 8.4 | 8.6 | 8.5 | 8.5 | 8.5 | 8.5 | 8.5 | 8.5 |
| Average particle diameter (nm) |  | 140 | 140 | 140 | 155 | 155 | 155 | 140 | 140 | 140 |
| Gel content (%) |  | 54 | 54 | 55 | 56 | 57 | 54 | 55 | 55 | 55 |
| SI value |  | 20 | 15 | 15 | 17 | 20 | 22 | 22 | 22 | 22 |
| Weight average molecular weight |  | 135000 | 132000 | 140000 | 139000 | 146000 | 145000 | 130000 | 125000 | 125000 |
| Number average molecular weight |  | 41000 | 40000 | 42000 | 45000 | 44000 | 44000 | 40000 | 40000 | 42000 |
| Degree of dispersion |  | 3.3 | 3.3 | 3.3 | 3.1 | 3.3 | 3.3 | 3.3 | 3.1 | 3.0 |

*[1]Propylene glycol

TABLE 10

Physical properties of the latex compounds for dip molding and dip-molded products

| Evaluation items |  | Examples |  |  |  |  |  | Comparative Examples |  |  |
|---|---|---|---|---|---|---|---|---|---|---|
|  |  | 16 | 17 | 18 | 19 | 20 | 21 | 9 | 10 | 11 |
| Appearance of latex compound for molding |  | ○ | ○ | ○ | ○ | ○ | ○ | ○ | ○ | X |
| Chemical stability of latex compound for molding |  | ⊙ | ⊙ | ⊙ | ⊙ | ⊙ | ⊙ | Δ | Δ | Δ |
| Thickness of gloves (mm) |  | 0.11 | 0.11 | 0.11 | 0.11 | 0.11 | 0.11 | 0.12 | 0.11 | 0.12 |
| Oil resistance | Kerosene (%) | 111 | 113 | 110 | 113 | 112 | 110 | 118 | 117 | 119 |
|  | Gasoline (%) | 114 | 115 | 117 | 117 | 115 | 115 | 116 | 117 | 116 |
|  | Toluene (%) | 124 | 121 | 126 | 125 | 121 | 123 | 127 | 122 | 127 |
| Feeling: 300% modulus (MPa) |  | 1.7 | 1.5 | 1.7 | 1.5 | 1.6 | 1.5 | 1.6 | 1.7 | 1.6 |
| Pinholes |  | ⊙ | ⊙ | ⊙ | ⊙ | ⊙ | ⊙ | X | Δ | Δ |
| Stickiness resistance |  | ○ | ○ | ○ | ⊙ | ⊙ | ⊙ | X | X | ⊙ |

As is evident from Table 10, any latex compounds for dip molding in Examples 16 to 18 where the components (A) and (B) were blended and in Examples 19 to 21 where the components (A), (B) and (C) were blended, were superior in appearance and chemical stability of latex compound to a coagulant, and their molded products were excellent in respect of pinholes and stickiness resistance, and significant improvements were recognized particularly with respect to pinholes in the products and chemical stability of latex compound to a coagulant. On the other hand, the molded products in Comparative Example 9 where the components (A) and (B) were not blended and in Comparative Example 11 where the component (A) was not blended were problematic with respect to pinholes and stickiness resistance. The molded product in Comparative Example 11 where out of the components (A), (B) and (C), only the component (A) was excessively blended was excellent in stickiness resistance, but the latex compound for dip molding was problematic in respect of appearance and chemical stability of latex compound for a coagulant and the molded product was problematic for pinholes.

Among the various physical properties in Tables 5 to 10 for the Examples and Comparative Examples, the physical properties of the molded products were evaluated by taking the average of 10 samples measured in the following methods.

(1) Average particle diameter

Coulter counter MODEL N4+ (Bechman Coulter Co., Ltd., JP) was used for measurement.

(2) Methyl ethyl ketone-insoluble content (gel content)

The resulting copolymer latex composition was poured onto a glass plate to form a film of 0.3 mm in thickness thereon. This film was cut into cubes of 2 to 3 mm, and 0.4 g cubes were weighed accurately. The sample was immersed in 100 ml methyl ethyl ketone and shaken for 6 hours in a shaking thermostatic chamber at 30° C. The sample was filtered off with a 100 mesh screen. The solid content in the filtrate was determined, and from this solid content in the sol, the gel content was calculated.

(3) SI value

The resulting copolymer latex composition was poured onto a glass plate to form a film of 0.3 mm in thickness thereon. 0.4 g of the copolymer latex film of the known weight was immersed in 100 ml methyl ethyl ketone and shaken for 6 hours in a shaking thermostatic chamber at 30° C. The sample was filtered off, and its wet weight was weighed. Subsequently, its dry weight was weighed, and the ratio of the dry weight to the wet weight was calculated to determine the SI value.

(4) Average molecular weight and degree of dispersion

The resulting copolymer latex was poured on a glass plate to form a film of 0.3 mm in thickness thereon. After this film was immersed in tetrahydrofuran for 24 hours, the average molecular weight of its soluble sol in tetrahydrofuran was determined by gel permeation chromatography using polystyrene standards. The degree of dispersion was determined in terms of weight average molecular weight number average molecular weight.

(5) Oil resistance

After the resulting glove-shaped dip-molded product was immersed in petroleum, gasoline and toluene respectively for 24 hours at room temperature, its oil resistance was evaluated in terms of the degree of swollen area determined using the following formula. A lower degree of swollen area is indicative of higher oil resistance.

Degree of swollen area (%)=$A/A_0$×100

$A_0$: The area of the film before immersion,
A: The area of the film after immersion.

(6) Feeling

The feeling to the skin was expressed in terms of the strength of the glove-shaped dip-molded product upon 300% elongation after elongated at a rate of 300 mm/min. A lower number of 300% modulus is indicative of softer feeling.

(7) Appearance of the latex compound for dip molding

The appearance of the latex compound for dip molding was visually judged.

∘: Completely uniform.

Δ: Slight floats are observed.

x: Floats are clearly observed and an increase in viscosity is recognized.

(8) Chemical stability of the latex compound to a coagulant

A ceramic plate (5 cm×10 cm) was immersed for 10 seconds in 15% calcium nitrate solution, and immediately the ceramic plate was raised and dried under the conditions of 100° C. for 3 minutes. Subsequently, the ceramic plate was immersed in a latex having 30 weight % of a solid content for 5 seconds, then raised, kept for 1 second, and immersed in water (1 liter) previously warmed at 40° C.

The degree of water turbidity was judged by measurement* of the concentration of turbid materials by Coulter counter Model N4+.

⊚: Completely transparent (concentration: 1.0 to 2.0 $e^+\times10^4$)

∘: Very slightly turbid (concentration: 2.1 $e^+\times10^4$ to 9.9 $e^+\times10^4$)

Δ: Slightly turbid (concentration: 1.0 $e^+\times10^5$ to 9.9 $e^+\times10^6$)

x: Completely turbid (concentration: 1.0 $e^+\times10^7$ or more)

*Measurement of the concentration: The concentration correlates with the degree of light scattering, specifically the number of emitted electrons per second. A larger number is indicative of higher concentration.

(9) Pinholes

The resulting glove-shaped dip-molded product was observed for occurrence of pinholes and evaluated under the following criteria (10 sets of ⊚: No pinholes.

∘: 1 pinhole in gloves.

Δ: 2 to 3 pinholes in gloves.

x: 4 or more pinholes in gloves.

(10) Stickiness resistance

One sheet of the resulting glove-shaped dip-molded products was laid one on the other and pressed with a desk pressing machine under the conditions of 50° C.×50 kg×5 minutes and evaluated under the following criteria:

⊚: Easily removed.

∘: Removed smoothly with slight resistance.

Δ: Upon removal, sound is made due to considerable resistance.

x: Stuck and hardly removed.

From the latex compound for dip molding according to the present invention, dip-molded products of very high qualities excellent in oil resistance with soft feeling to the skin and high stickiness resistance can be efficiently produced. Accordingly, it is useful as a latex compound for production of dip-molded products requiring high qualities, such as surgical gloves.

What is claimed is:

1. A latex compound for dip molding, which comprises a copolymer latex (L) obtained by emulsion polymerization of (1) a monomer mixture comprising 15 to 45 parts by weight of acrylonitrile or methacrylonitrile, 35 to 80 parts by weight of a conjugated diene monomer, 0.1 to 20 parts by weight of an ethylenically unsaturated carboxylic acid monomer, and 0 to 20 parts by weight of other ethylenically unsaturated monomers copolymerizable with the above monomers, based on a total of 100 parts by weight of the monomer mixture, and (2) 0.05 to 5.0 parts by weight, based on a total of 100 parts by weight of the monomer mixture, or a bubble breaker (A) consisting of at least one fatty acid having 8 to 22 carbon atoms or a salt thereof, wherein said bubble breaker includes 30 to 45% by weight of stearic acid or a salt thereof.

2. The latex compound for dip molding according to claim 1, which further comprises 0.1 to 5.0 parts by weight of a dialkylsulfosuccinate salt (B) represented by formula (1):

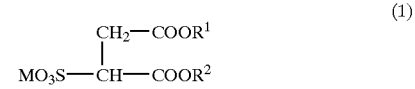

(1)

wherein $R^1$ and $R^2$ are the same or different and represent an alkyl group containing 5 to 12 carbon atoms and M is metal ion or ammonium ion and/or 0.5 to 10.0 parts by weight of an alkyl benzene sulfonate (C) whose alkyl group contains 13 to 20 carbon atoms per 100 parts by weight of the monomer mixture.

3. The latex compound for dip molding according to claim 1, wherein the emulsion polymerization of the monomer mixture is conducted in the presence of a polyhydroxy compound.

4. The latex compound for dip molding according to claim 3, wherein the polyhydroxy compound is a glycol.

5. The latex compound for dip molding according to claim 1, wherein the copolymer latex (L) has 51 to 90% by weight of gel content (methyl ethyl ketone-insolubles).

6. The latex compound for dip molding according to claim 1, wherein the copolymer latex (L) is obtained by emulsion polymerization of the monomer mixture in the presence of a seed polymer having an average particle diameter of 20 to 90 nm and glass transition temperature (Tg) of −50 to 50° C.

obtained by emulsion polymerization between a vinyl cyanide monomer and an ethylenically unsaturated monomer copolymerizable therewith.

7. A dip-molded product produced by dip molding using the latex compound for dip molding according to claim 1.

8. The dip-molded product according to claim 7, which is a glove.

9. A method for producing a latex compound for dip-molding, which comprises emulsion polymerization of (1) a monomer mixture comprising 15 to 45 parts by weight of acrylonitrile or methacrylonitrile, 35 to 80 parts by weight of a conjugated diene monomer, 0.1 to 20 parts by weight of an ethylenically unsaturated carboxylic acid monomer, and 0 to 20 parts by weight of other ethylenically unsaturated monomers copolymerizable with the above monomers, based on a total of 100 parts by weight of the monomer mixture, and (2) 0.05 to 5.0 parts by weight, based on a total of 100 parts by weight of the monomer mixture, of a bubble breaker (A) consisting of at least one fatty acid having 8 to 22 carbon atoms or a salt thereof, wherein said bubble breaker includes 30 to 45% by weight of stearic acid or a salt thereof.

10. The method according to claim 9, wherein the emulsion polymerization is conducted at a temperature of 0–40° C.

* * * * *